US008963442B2

(12) United States Patent
Ribarich (10) Patent No.: US 8,963,442 B2
(45) Date of Patent: Feb. 24, 2015

(54) DRIVER CIRCUIT WITH AN INCREASED POWER FACTOR

(75) Inventor: Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 119 days.

(21) Appl. No.: 12/590,301

(22) Filed: Nov. 4, 2009

(65) Prior Publication Data

US 2011/0101880 A1 May 5, 2011

(51) Int. Cl.
*H05B 41/24* (2006.01)
*H05B 33/08* (2006.01)

(52) U.S. Cl.
CPC ........ *H05B 33/0815* (2013.01); *Y02B 20/346* (2013.01); *Y02B 20/348* (2013.01)
USPC ............... 315/250; 315/200 R; 315/209 R; 315/265; 315/294; 315/308

(58) Field of Classification Search
USPC ......... 315/200 R, 209 R, 210, 246, 247, 250, 315/265, 272, 291, 294, 308, 312
See application file for complete search history.

(56) References Cited

U.S. PATENT DOCUMENTS

| 5,488,269 | A * | 1/1996 | El-Hamamsy et al. ....... 315/307 |
| 6,108,218 | A * | 8/2000 | Igarashi et al. ............ 363/21.16 |
| 6,411,045 | B1 | 6/2002 | Nerone |
| 6,891,339 | B2 * | 5/2005 | Ribarich et al. .............. 315/291 |
| 7,109,665 | B2 * | 9/2006 | Green ............................ 315/224 |
| 7,378,807 | B2 * | 5/2008 | Feldtkeller et al. .......... 315/308 |
| 7,408,307 | B2 * | 8/2008 | Ribarich ....................... 315/291 |
| 7,902,770 | B2 * | 3/2011 | Shakuda ....................... 315/291 |
| 2003/0043611 | A1 | 3/2003 | Bockle |
| 2003/0122502 | A1 | 7/2003 | Clauberg |
| 2007/0080652 | A1 | 4/2007 | Elferich |
| 2008/0084167 | A1 | 4/2008 | Waffenschmidt |
| 2009/0021175 | A1 | 1/2009 | Wendt |
| 2009/0200965 | A1 * | 8/2009 | King ............................. 315/307 |
| 2009/0289569 | A1 * | 11/2009 | Yoshida et al. ............... 315/246 |
| 2009/0295300 | A1 * | 12/2009 | King ......................... 315/209 R |
| 2010/0020569 | A1 * | 1/2010 | Melanson et al. ......... 363/21.03 |
| 2010/0072518 | A1 * | 3/2010 | Shen et al. .................... 257/197 |
| 2010/0109571 | A1 * | 5/2010 | Nishino et al. ............... 315/307 |
| 2010/0225239 | A1 * | 9/2010 | King ............................. 315/224 |
| 2010/0237799 | A1 * | 9/2010 | Choi et al. .................... 315/294 |

FOREIGN PATENT DOCUMENTS

| JP | 2002-44943 | 2/2002 |
| JP | 2008-187821 | 8/2008 |
| JP | 2009-129787 | 6/2009 |
| WO | WO2007060128 A1 | 5/2007 |
| WO | WO2008029325 A1 | 3/2008 |

* cited by examiner

*Primary Examiner* — Douglas W Owens
*Assistant Examiner* — Thai Pham
(74) *Attorney, Agent, or Firm* — Farjami & Farjami LLP (57) ABSTRACT

According to one exemplary embodiment, driver circuit coupled between an AC line and a load includes a first semiconductor switch interposed between a bus voltage and a resonant circuit and a second semiconductor switch interposed between the resonant circuit and a ground, where the resonant circuit drives the load. In the driver circuit, the bus voltage has a shape substantially corresponding to a shape of a rectified AC line voltage, thereby increasing a power factor of the driver circuit. The driver circuit can further include a full-bridge rectifier disposed between the resonant circuit and the load. The load can include at least one LED.

18 Claims, 5 Drawing Sheets

DRIVER CIRCUIT WITH AN INCREASED POWER FACTOR

In the present application, "group III-V semiconductor" refers to a compound semiconductor that includes at least one group III element and at least one group V element, such as, but not limited to, gallium nitride (GaN), gallium arsenide (GaAs), indium aluminum gallium nitride (InAlGaN), indium gallium nitride (InGaN) and the like. Analogously, "III-nitride semiconductor" refers to a compound semiconductor that includes nitrogen and at least one group III element, such as, but not limited to, GaN, AlGaN, InN, AlN, InGaN, InAlGaN and the like.

BACKGROUND OF THE INVENTION

1. Field of the Invention

The present invention is generally in the field of electrical circuits. More particularly, the invention is in the field of driver circuits for powering loads.

2. Background Art

Applications, such as lighting applications, can require a load, such as a load including one or more light-emitting diodes (LEDs), to be powered off-line, i.e., from an AC power source, such as an AC line. To power a load, such as an LED load, from an AC line, the AC line voltage is typically converted into a rectified DC voltage via a full-bridge rectifier. The rectified DC voltage can then be appropriately filtered to provide a substantially constant DC voltage, which can be converter to an appropriate voltage level as required by the load, such as an LED load. However, conventional solutions for powering a load, such as a load including one or more LEDs, from an AC line (i.e. off-line) can suffer from various drawbacks.

One conventional solution for powering a load, such as a load including one or more LEDs, off-line utilizes a flyback circuit. However, flyback circuits typically have an efficiency of only 80.0 to 85.0 percent and a maximum power limitation of approximately 50.0 watts, which are undesirable features. Another conventional solution utilizes a buck converter to provide the necessary DC voltage required for a load, such as an LED load. However, the buck converter generally has an undesirably low power factor. Additionally, the aforementioned conventional solutions typically require a large filter capacitor, such as a large electrolytic capacitor, which can undesirably increase cost.

SUMMARY OF THE INVENTION

Driver circuit with an increased power factor, substantially as shown in and/or described in connection with at least one of the figures, and as set forth more completely in the claims.

DETAILED DESCRIPTION OF THE INVENTION

The present invention is directed to a driver circuit with an increased power factor. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
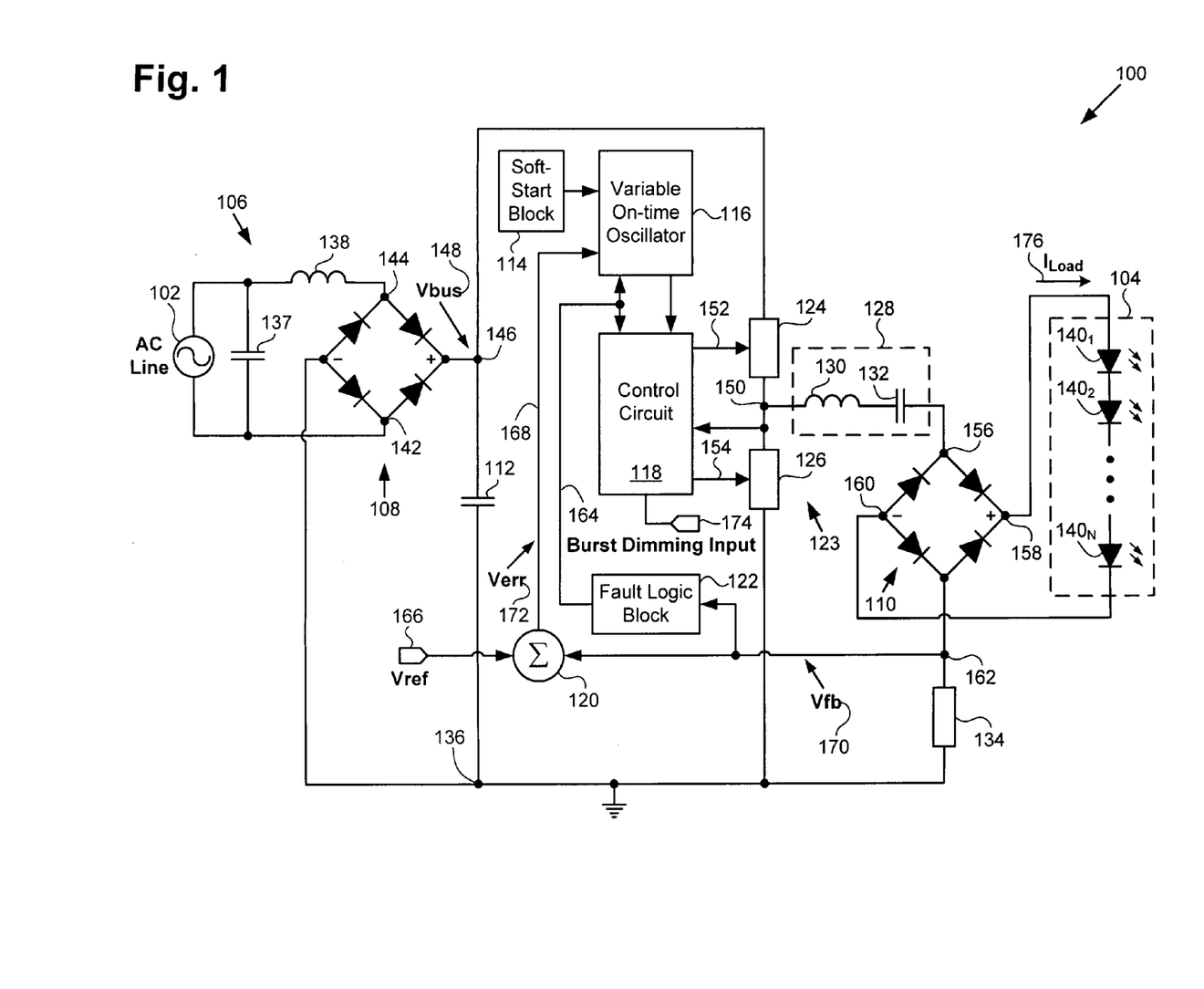
FIG. 1 illustrates a circuit diagram of an exemplary driver circuit in accordance with one embodiment of the present invention.

FIG. 1 shows a circuit diagram of an exemplary driver circuit coupled between an AC line and a load in accordance with one embodiment of the present invention. Driver circuit 100, which can be a resonant mode driver circuit, is coupled between AC line 102 and load 104. Driver circuit 100 includes electromagnetic interference (EMI) filter 106, full-bridge rectifiers 108 and 110, capacitor 112, soft-start block 114, variable on-time oscillator 116, control circuit 118, summation block 120, fault logic block 122, half-bridge switching circuit 123, resonant circuit 128, and current sensor 134. Half-bridge switching circuit 123 includes semiconductor switches 124 and 126 (also referred to simply as "switches 124 and 126" in the present application), resonant circuit 128 includes inductor 130 and capacitor 132, and EMI filter 106 includes capacitor 137 and inductor 138.

In an embodiment of the invention, load 104 includes series-coupled LEDs $140_1, 140_2, \ldots, 140_N$, where "N" can be any integer number as required for a particular application. In an embodiment, load 104 can include at least one LED. In one embodiment, load 104 can include multiple LEDs coupled together in an anti-parallel configuration, where each LED is oriented in an opposite direction with respect to an adjacent LED. In such embodiment, full-bridge rectifier 110 is not utilized and load 104 is coupled between resonant circuit 128 and current sensor 134. However, the present invention's driver circuit can be generally utilized to power a load other than an LED load, such as a load including a semiconductor device(s) other than an LED.

As shown in FIG. 1, AC line 102 is coupled across first and second terminals of capacitor 137 and coupled between a first terminal of inductor 138 and a first AC terminal of full-bridge rectifier 108 at node 142, and a second terminal of inductor 138 is coupled to a second AC terminal of full-bridge rectifier 108 at node 144. AC line 102 can provide sufficient AC power (i.e. sufficient AC voltage and current) as required by driver circuit. In an embodiment of the invention, AC line 102 can provide an AC line voltage of, for example, between 110.0 volts and 120.0 volts. EMI filter 106, which includes capacitor 137 and inductor 138, forms a low pass filter for filtering high frequency interference, such as EMI.

Also shown in FIG. 1, a first terminal of capacitor 112 is coupled to a positive terminal of full-bride rectifier 108 at node 146 and a second terminal of capacitor 112 is coupled to a negative terminal of full-bridge rectifier 108 at node 136, which also provides a ground for driver circuit 100. In an embodiment of the invention, capacitor 112, which is a bus capacitor, can be a non-polarized capacitor having a relatively low capacitance. Capacitor 112 can have a capacitance of, for example, less than approximately 0.5 microfarads (µfd) in an embodiment of the invention. Capacitor 112 provides substantially no low-frequency filtering of the rectified AC voltage provided by full-bridge rectifier 108. In the invention's driver circuit, a high capacitance polarized capacitor, such as a high capacitance electrolytic capacitor, is not required.

In an embodiment of the invention, capacitor 112 has a sufficient low capacitance such that bus voltage (Vbus) 148, which is provided at node 146, has a shape that substantially corresponds to a shape of the rectified AC voltage provided by full-bridge rectifier 108. In one embodiment, capacitor 112 is not utilized. In such embodiment, full-bridge rectifier 108 requires fast switching diodes, such as diodes having a switching speed of, for example, approximately 100.0 nanoseconds (ns). In one embodiment, full-bridge rectifier 108 can have fast switching diodes that have a switching speed of less than approximately 100.0 ns. By providing a DC bus voltage (i.e. Vbus 148) having a shape that substantially corresponds to a shape of a rectified AC voltage, an embodiment of the invention's driver circuit 100 achieves an increased (i.e. high) power factor.

Further shown in FIG. 1, a first terminal of switch 124 is coupled to node 146 (Vbus 148), a second terminal of switch 124 is coupled to first terminals of switch 126 and inductor 130 and an input of control circuit 118 at node 150, and a second terminal of switch 126 is coupled to the negative terminal of full-bridge rectifier 108 at node 136 (i.e. ground). In an embodiment, switches 124 and 126 can each be, for example, a silicon field effect transistor (FET), such as a silicon metal-oxide semiconductor FET (MOSFET). In one embodiment, switches 124 and 126 can each be a group III-V semiconductor device, such as, for example, a gallium nitride (GaN) device, which can be a GaN high electron mobility transistor (HEMT).

Also shown in FIG. 1, third terminals (i.e. a control terminals) of switches 124 and 126 are connected to control circuit 118 via respective control lines 152 and 154, a second terminal of inductor 130 is coupled to a first terminal of capacitor 132, and a second terminal of capacitor 132 is coupled to a first AC terminal of full-bridge rectifier 110 at node 156. Capacitor 132 provides an appropriate capacitance for resonant circuit 128 and inductor 130 provides an appropriate inductance for the resonant circuit. Further shown in FIG. 1, load 104 is coupled between a positive terminal of full-bridge rectifier 110 at node 158 and a negative terminal of full-bridge rectifier 110 at node 160. In particular, the anode of LED $100_1$ is coupled to node 158, the cathode of LED $140_1$ is coupled to the anode of LED $140_2$ ... and the cathode of LED $140_N$ (i.e. the last series-coupled LED) is coupled to node 160.

Also shown in FIG. 1, a second AC terminal of full-bridge rectifier 110 is coupled to a first terminal of current sensor 134, an input of fault logic block 122, and a first input of summation block 120 at node 162, and a second terminal of current sensor 134 is coupled to node 136 (i.e. ground). Current sensor 134 can comprise, for example, at least one resistor in an embodiment of the invention. In one embodiment, current sensor 134 can comprise a resistor having a resistance of, for example, less than approximately 1.0 ohm. Current sensor 134, which is interposed between full-bridge rectifier 110 and ground, can provide a direct measurement of the amplitude of full-wave rectified load (e.g. LED) current in an embodiment of the invention.

Further shown in FIG. 1, the output of fault logic block 122 is coupled to inputs of variable on-time oscillator 116 and control circuit 118 via line 164, reference voltage (Vref) 166 is coupled to a second input of summation block 120, and the output of summation block 120 is coupled to an input of variable on-time oscillator 116 via line 168. Fault logic block 122 can be configured to detect an occurrence of an open or short in load 104 and to provide an error detection signal to variable on-time oscillator 116 and control circuit 118 in response to the open or short in the load, thereby allowing driver circuit 100 to be safely disabled. In an embodiment of the invention, fault logic block 122 can detect, for example, an open LED in load 104. Summation block 120 can be configured to receive feedback voltage (Vfb) 170 from node 162 and Vref 166, subtract Vfb 170 from Vref 168 to determine error voltage (Verr) 172, and provide Verr 172 to variable on-time oscillator 116 via line 168.

Control circuit 118 can be configured to control the respective on-times of switches 124 and 126 in half-bridge switching circuit 123 by providing appropriate drive signals to the respective control terminals (e.g. gates) of the switches in response to a control signal from variable on-time oscillator 116. In an embodiment of the invention, control circuit 118 can be configured to cause each of switches 124 and 126 to have a substantially constant duty cycle and to vary the switching frequency of the switches in response to a control signal from variable on-time oscillator 116. In one embodiment, control circuit 118 can be configured to cause each of switches 124 and 126 to have a duty cycle of, for example, approximately 50.0 percent.

Also shown in FIG. 1, soft-start block 114 is coupled to an input of variable on-time oscillator 116 and can be configured to cause the switching frequency of half-bridge switching circuit 123, which includes switches 124 and 126, to start at a maximum frequency and sweep down towards the resonant frequency of resonant circuit 128 when drive circuit 100 is turned on so as to prevent damaging high peak currents from occurring in load 104. Further shown in FIG. 1, burst dimming input 174 is coupled to an input of control circuit 118. Burst dimming input 174 can provide burst dimming of LEDs $140_1, 140_2, \ldots, 140_N$ in load 104 by causing control circuit 118 to alternately turn on and off for a predetermined duration. In an embodiment of the invention, burst dimming input 174 can provide burst dimming of LEDs $140_1, 140_2, \ldots, 140_N$ in load 104 by causing control circuit 118 to alternately turn on and off for several milliseconds. However, burst dimming can undesirably decrease the power factor of driver circuit 100.

In an embodiment of the invention, continuous dimming of LEDs $140_1, 140_2, \ldots, 140_N$ in load 104 can be provided by utilizing Vref 166 to cause the load current to smoothly vary up and down. In another embodiment, Vref 166 can be stepped up and down between a maximum level and a very small non-zero level at a predetermined duty cycle so as to reduce the average load current (i.e. LED current in load 104).

In one embodiment of the invention, load 104 can be isolated from resonant circuit 128 by utilizing a transformer having a primary and a secondary winding. In such embodiment, the primary winding of the transformer can be interposed between resonant circuit 128 and current sensor 134 in place of full-bridge rectifier 110 and the secondary winding of the transformer can be coupled to load 104.

The operation of an embodiment of the invention's driver circuit 100 will now be discussed. When driver circuit 100 is turned on, soft-start block 114 causes the switching frequency of half-bridge switching circuit 123 to start at a maximum frequency and sweep down towards the resonant frequency of resonant circuit 128. As a result, load current ($I_{Load}$) 176 flowing through load 104 (i.e. through LEDs $140_1$, $140_2$, ..., $140_N$) increases slowly to a pre-determined level. Half-bridge switching circuit 123 is coupled to the bus voltage (i.e. Vbus 148) and is controlled by control circuit 118 so as to provide a high-frequency square-wave voltage to resonant circuit 128, which controls the load current (i.e. $I_{Load}$ 176).

Since output current flowing through resonant circuit 128 is an AC current, full-bridge rectifier 110 is provided between resonant circuit 128 and load 104 so that positive current is always flowing through LEDs $140_1$, $140_2$, ..., $140_N$ during each high-frequency switching cycle. Current sensor 134, which is interposed between the second AC terminal of full-bridge rectifier 110 at node 162 and ground, provides a direct measurement of the amplitude of the LED current (i.e. $I_{Load}$ 176). The measurement of the LED current provided by current sensor 134 is fed back to summation block 120 as Vfb 170, which is subtracted from Vref 166 in summation block 120. The difference between Vref 166 and Vfb 170 (i.e. Verr 172) is outputted by summation block 120 to variable on-time oscillator 116 so as to control the on-time of each of switches 124 and 126 in half-bridge switching circuit 123. In an embodiment of the invention, Verr 172 is utilized to steer the frequency of variable on-time oscillator 116 in a required direction so as to cause the LED current (i.e. $I_{Load}$ 176) to be substantially equal to a reference current corresponding to Vref 166.

The feedback loop including current sensor 134, summation block 120, variable on-time oscillator 116, and control circuit 118 can cause the amplitude of the LED current to be substantially constant by continuously adjusting the on-time of each of switches 124 and 126 in half-bridge switching circuit 123. In an embodiment of the invention, the aforementioned feedback loop can cause the amplitude of the LED current to be substantially constant so as to cause the root mean square (RMS) LED current to be within manufacturer's specifications. In an embodiment of the invention, the feedback loop can cause the switching frequency of half-bridge switching circuit 123 to increase in response to an increase in LED current, thereby causing the gain of resonant circuit 128 to decrease so as to decrease the LED current. If the LED current decreases, the feedback loop can decrease the switching frequency so as to increase the gain of resonant circuit 128 and, thereby, increase the LED current. The aforementioned feedback loop can cause the LED current to be substantially constant over line, load, and temperature variations.

In an embodiment of the invention's driver circuit 100, Vbus 148 (i.e. the DC bus voltage), which has a shape substantially corresponding to a shape of the rectified AC line voltage, is coupled to switch 124 of half-bridge switching circuit 123. The aforementioned shape of Vbus 148 can be provided by, for example, utilizing a non-polarized bus capacitor (i.e. capacitor 112) having a sufficiently low capacitance between node 146 and ground. By causing Vbus 148 to have a shape substantially corresponding to a shape of the rectified AC line voltage, an embodiment of the invention provides a driver circuit having an increased (i.e. high) power factor. In an embodiment of the invention, the RMS (root mean square) AC line input current can have shape that substantially corresponds to the shape of the AC line input voltage. In one embodiment, the peak current flowing through load 104 (i.e. through LEDs $140_1$, $140_2$, ..., $140_N$) can be limited. In such embodiment, the RMS AC line input current can have a shape that corresponds in part to a shape of the AC line input voltage.

Thus, by causing the DC bus voltage to have a shape substantially corresponding to a shape of the rectified AC line voltage, an embodiment of the invention's driver circuit 100 can power a load, such as an LED load, off-line while advantageously providing an increased power factor compared to a conventional solution employing a buck converter. Also, driver circuit 100 can provide a higher efficiency than a conventional solution that utilizes a flyback circuit, while avoiding the maximum power limitation of the flyback circuit.

Additionally, conventional solutions for off-line powering of a load, such as an LED load, typically require a large electrolytic filter capacitor to provide bus voltage filtering. However, an electrolytic filter capacitor can have a significantly lower life-time than an LED. Thus, by not requiring an electrolytic capacitor for bus voltage filtering, an embodiment of the invention can provide a driver circuit having increased reliability compared to the conventional solutions that utilize an electrolytic filter capacitor, while advantageously avoiding the cost of the electrolytic capacitor.

Figure 2:
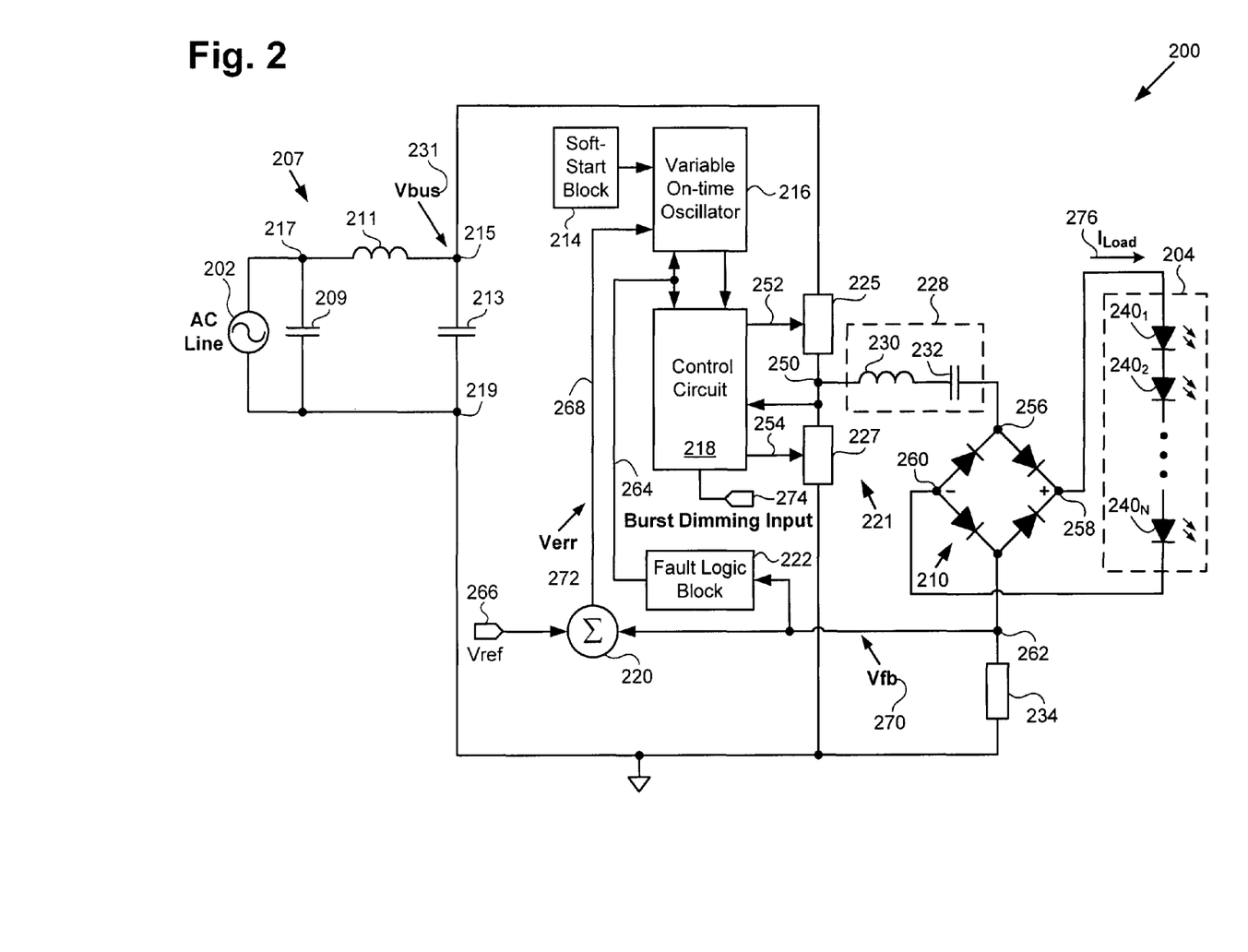
FIG. 2 illustrates a circuit diagram of an exemplary driver circuit in accordance with another embodiment of the present invention.

FIG. 2 shows a circuit diagram of an exemplary resonant mode driver circuit coupled between an AC line and a load in accordance with one embodiment of the present invention. Driver circuit 200, which can be a resonant mode driver circuit, is coupled between AC line 202 and load 204. Driver circuit 200 includes EMI filter 207, full-bridge rectifier 210, soft-start block 214, variable on-time oscillator 216, control circuit 218, summation block 220, fault logic block 222, half-bridge switching circuit 221, resonant circuit 228, and current sensor 234. Half-bridge switching circuit 221 includes semiconductor switches 225 and 227 (also referred to simply as "switches 225 and 227" in the present application), EMI filter 207 includes capacitors 209 and 213 and inductor 211, and resonant circuit 228 includes inductor 230 and capacitor 232.

In FIG. 2, AC line 202, load 204, full-bridge rectifier 210, soft-start block 214, variable on-time oscillator 216, control circuit 218, summation block 220, fault logic block 222, resonant circuit 228, inductor 230, capacitor 232, current sensor 234, LEDs $240_1$, $240_2$, ..., $240_N$, Vref 266, Vfb 270, Verr 272, and $I_{Load}$ 276 correspond, respectively, to AC line 102, load 104, full-bridge rectifier 110, soft-start block 114, variable on-time oscillator 116, control circuit 118, summation block 120, fault logic block 122, resonant circuit 128, inductor 130, capacitor 132, current sensor 134, LEDs $140_1$, $140_2$, ..., $140_N$, Vref 166, Vfb 170, Verr 172, and $I_{Load}$ 176 in FIG. 1. It is noted that only the differences between driver circuit 200 and driver circuit 100 will be discussed in detail in the present application to preserve brevity.

As shown in FIG. 2, AC line 202 is coupled to first terminals of capacitor 209 and inductor 211 at node 217 and coupled to a second terminal of capacitor 209 and a first terminal of capacitor 213 at node 219, which provides a ground for driver circuit 200. Also shown in FIG. 2, second terminals of inductor 211 and capacitor 213 are coupled to node 215, which provides bus voltage (Vbus) 231. EMI filter 207, which includes capacitors 209 and 213 and inductor 211, forms a low pass filter for filtering high-frequency interference, such as EMI. In an embodiment of the invention's driver circuit 200, EMI filter 207 is interposed between AC line 202 and node 215, which provides Vbus 231. Thus, in driver circuit 200, Vbus 231 is an AC voltage having a shape that substantially corresponds to the shape of the AC line voltage provided by AC line 202.

Further shown in FIG. 2, a first terminal of switch 225 is coupled to node 215 (Vbus 231), a second terminal of switch 225 is coupled to first terminals of switch 227 and inductor 230 and an input of control circuit 218 at node 250, and a second terminal of switch 227 is coupled to node 219 (i.e. ground). In driver circuit 200, switches 225 and 227 can each be a group III-V semiconductor device, such as, for example, a GaN device, which can be a GaN HEMT (high electron mobility transistor). Also shown in FIG. 2, third terminals (i.e. control terminals) of switches 225 and 227 are coupled to control circuit 218 via respective control lines 252 and 254, and a second terminal of capacitor 232 is coupled to a first AC terminal of full-bridge rectifier 210 at node 256.

Further shown in FIG. 2, load 204 is coupled between a positive terminal of full-bridge rectifier 210 at node 258 and a negative terminal of full-bridge rectifier 210 at node 260. In particular, the anode of LED $240_1$ is coupled to node 258, the cathode of LED $240_1$ is coupled to the anode of LED $240_2$ . . . and the cathode of LED $240_N$ (i.e. the last series-coupled LED) is coupled to node 260. Also shown in FIG. 2, a second AC terminal of full-bridge rectifier 210 is coupled to a first terminal of current sensor 234, an input of fault logic block 222, and a first input of summation block 220 at node 262, and a second terminal of current sensor 234 is coupled to node 219 (i.e. ground). Current sensor 234, which is interposed between full-bridge rectifier 210 and ground, can provide a direct measurement of the amplitude of full-wave rectified load current (i.e. LED current) in an embodiment of the invention.

Further shown in FIG. 2, the output of fault logic block 222 is coupled to inputs of variable on-time oscillator 216 and control circuit 218 via line 264, Vref 266 is coupled to a second input of summation block 220, and the output of summation block 220 is coupled to an input of variable on-time oscillator 216 via line 268. Also shown in FIG. 2, soft-start block 214 is coupled to variable on-time oscillator 216. Soft-start block 214, fault logic block 222, and summation block 220 can be configured substantially similar to respective soft-start block 114, fault logic block 122, and summation block 120 in driver circuit 100 in FIG. 1. Further shown in FIG. 2, burst dimming input 274 is coupled to an input of control circuit 218. In driver circuit 200, LED dimming can be provided in a substantially similar manner as discussed above in relation to an embodiment of the invention's driver circuit 100 in FIG. 1.

Control circuit 218 can be configured to control the respective on-times of switches 225 and 227 in half-bridge switching circuit 221 by providing appropriate drive signals to the respective control terminals (e.g. gates) of the switches in response to a control signal from variable on-time oscillator 216. In an embodiment of the invention, control circuit 218 can be configured to cause each of switches 225 and 227 to have a substantially constant duty cycle and to vary the switching frequency of the switches in response to a control signal from variable on-time oscillator 216. In one embodiment, control circuit 218 can be configured to cause each of switches 225 and 227 to have a duty cycle of, for example, approximately 50.0 percent.

By utilizing a group III-V semiconductor device, such as a GaN HEMT, for each of switches 225 and 227, an embodiment of the invention's driver circuit 200 can eliminate an input full-bridge rectifier, such as full-bridge rectifier 108 in FIG. 1, and a DC bus capacitor, such as capacitor 112 in FIG. 1. As a result, current in half-bridge switching circuit 221 and current in resonant circuit 228 can flow when the AC line (i.e. AC line 202) is positive or negative.

The operation of driver circuit 200 is substantially similar to the operation of driver circuit 100 as discussed above. In an embodiment of the invention's driver circuit 200, Vbus 231 is an AC bus voltage having a shape that substantially corresponds to the shape of the AC voltage provide by AC line 202. As a result, an embodiment of the invention's driver circuit 200 can provide an increased (i.e. high) power factor. In an embodiment, the RMS AC line current drawn by driver circuit 200 can have a shape that substantially corresponds to the shape of the AC line input voltage. In one embodiment, the peak current flowing through load 204 (i.e. through LEDs $240_1$, $240_2$, . . . , $240_N$) can be limited. In such embodiment, the RMS AC line current can have a shape that corresponds in part to the shape of the AC line input voltage. An embodiment of the invention's driver circuit 200 can also advantageously provide low total harmonic distortion (THD). Driver circuit 200 can further provide similar advantages as discussed above in relation to an embodiment of the invention's driver circuit 100 in FIG. 1.

Figure 3:
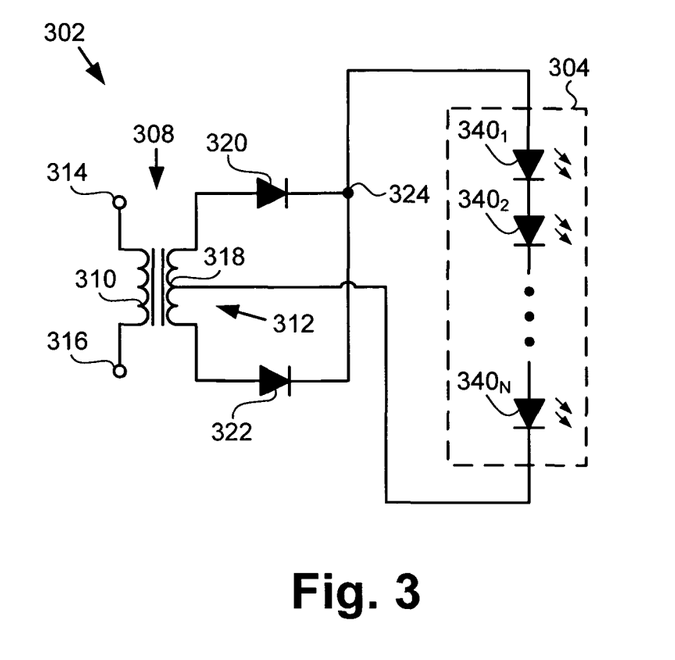
FIG. 3 illustrates a circuit diagram of an exemplary circuit configuration for providing load isolation for an embodiment of the invention's driver circuit.

FIG. 3 shows a circuit diagram of an exemplary circuit configuration for providing load isolation for an embodiment of the invention's driver circuit. In FIG. 3, circuit 302 is coupled to load 304, which corresponds to load 104 in FIG. 1 and load 204 in FIG. 2. Circuit 302 includes transformer 308, which includes primary winding 310, secondary winding 312, terminals 314 and 316, and center tap 318, and diodes 320 and 322. Load 304 includes LEDs $340_1$, $340_2$, . . . , $340_N$, which correspond to LEDs $140_1$, $140_2$, . . . , $140_N$ in load 104 in FIG. 1 and LEDs $240_1$, $240_2$, . . . , $240_N$ in load 204 in FIG. 2. As shown in FIG. 3, the anode of diode 320 is coupled to a first terminal of secondary winding 312 of transformer 302, the anode of diode 322 is coupled to a second terminal of secondary winding 312, and load 304 is coupled between center tap 318 of secondary winding 312 and the cathodes of diodes 320 and 322 at node 324.

In an embodiment of the invention, full-bridge rectifier 110 in driver circuit 100 can be replaced with circuit 302 in FIG. 3 to provide isolation between driver circuit 100 and load 104, where terminals 314 and 316 of primary winding 310 of transformer 308 can be coupled to respective nodes 156 and 162 in driver circuit 100, and where load 104 can be coupled to secondary winding 312 of transformer 308 in a similar manner as load 304 in FIG. 3. In another embodiment, full-bridge rectifier 210 in driver circuit 200 can be replaced with circuit 302 in FIG. 3 in a similar manner so as to provide isolation between driver circuit 200 and load 204. In circuit 302, since center tap 318 of secondary winding 312 is utilized, only two diodes (i.e. diodes 320 and 322) are required to achieve full-wave rectification of LED output current.

Figure 4:
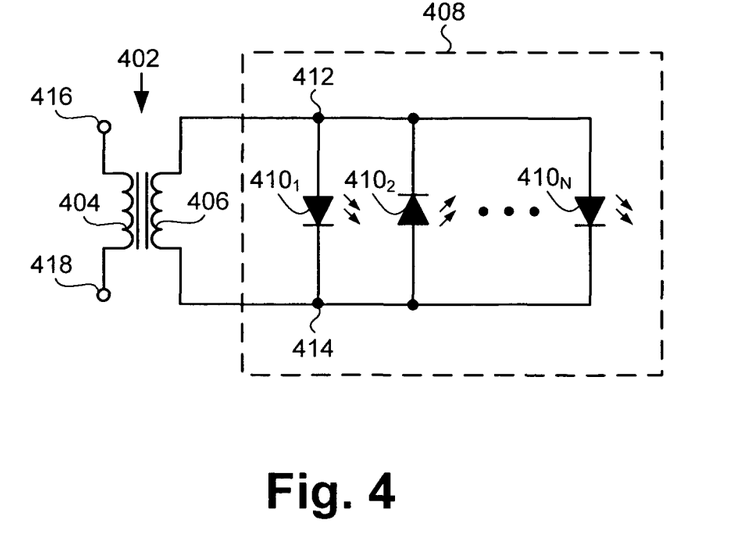
FIG. 4 illustrates a circuit diagram of another exemplary circuit configuration for providing load isolation for an embodiment of the invention's driver circuit.

FIG. 4 shows a diagram of another exemplary circuit configuration for providing load isolation for an embodiment of the invention's driver circuit. In FIG. 4, transformer 402 includes primary winding 404 and secondary winding 406 and load 408, which is coupled to transformer 402, includes LEDs $410_1$, $410_2$, . . . , $410_N$, which are coupled together in an anti-parallel configuration. As shown in FIG. 4, the anode of LED $410_1$ is coupled to a first terminal of secondary winding 406 at node 412, the cathode of LED $410_1$ is coupled to a second terminal of secondary winding 406 at node 414, the anode of LED $410_2$ is coupled to node 414, the cathode of LED $410_2$ is coupled to node 412, the anode of LED $410_N$ is coupled to node 412, and the cathode of LED $410_N$ is coupled to node 414. Thus, in the circuit configuration shown in FIG. 4, primary winding 404 of transformer 402 is isolated from load 408, which is coupled to secondary winding 406 of transformer 402.

In an embodiment of the invention, full-bridge rectifier 110 and load 104 in driver circuit 100 can be replaced with transformer 402 and load 408 in FIG. 4 to provide isolation between driver circuit 100 and an LED load (i.e. load 408), where terminals 416 and 418 of primary winding 404 of transformer 402 can be coupled to respective nodes 156 and 162 in driver circuit 100. In another embodiment, full-bridge rectifier 210 and load 204 in driver circuit 200 can be replaced with transformer 402 and load 408 in FIG. 4 in a similar manner so as to provide isolation between driver circuit 200 and an LED load (i.e. load 408).

Figure 5:
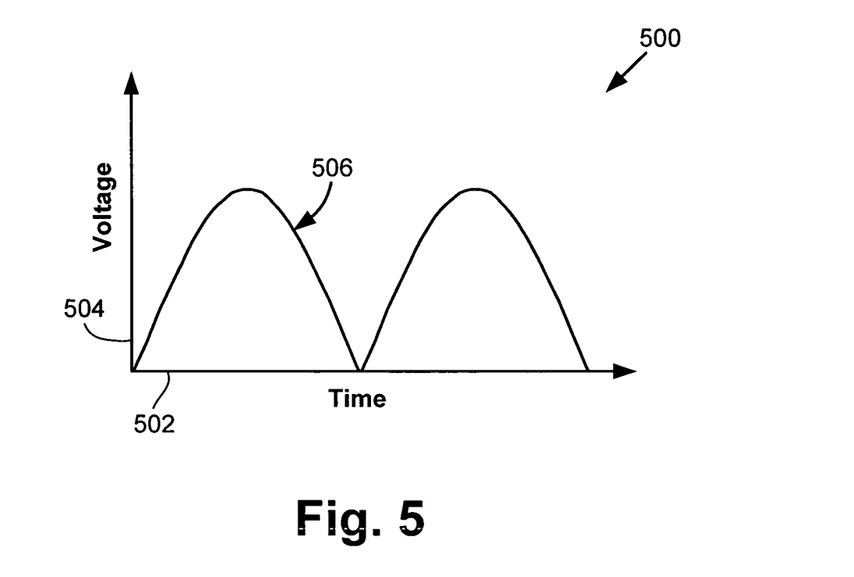
FIG. 5 is a graph showing an exemplary bus voltage in accordance with one embodiment of the present invention.

FIG. 5 shows exemplary graph 500 including an exemplary DC bus voltage in accordance with one embodiment of the present invention. Graph 500 includes time axis 502, voltage axis 504, and DC bus voltage 506. In graph 500, DC bus voltage 506 corresponds to Vbus 148 in an embodiment of the invention's driver circuit 100 in FIG. 1. As shown in graph 500, DC bus voltage 506 has a shape that substantially corresponds to a shape of a rectified AC line voltage, such as a rectified AC line voltage provided by full-bridge rectifier 108 at node 146 in FIG. 1.

Figure 6:
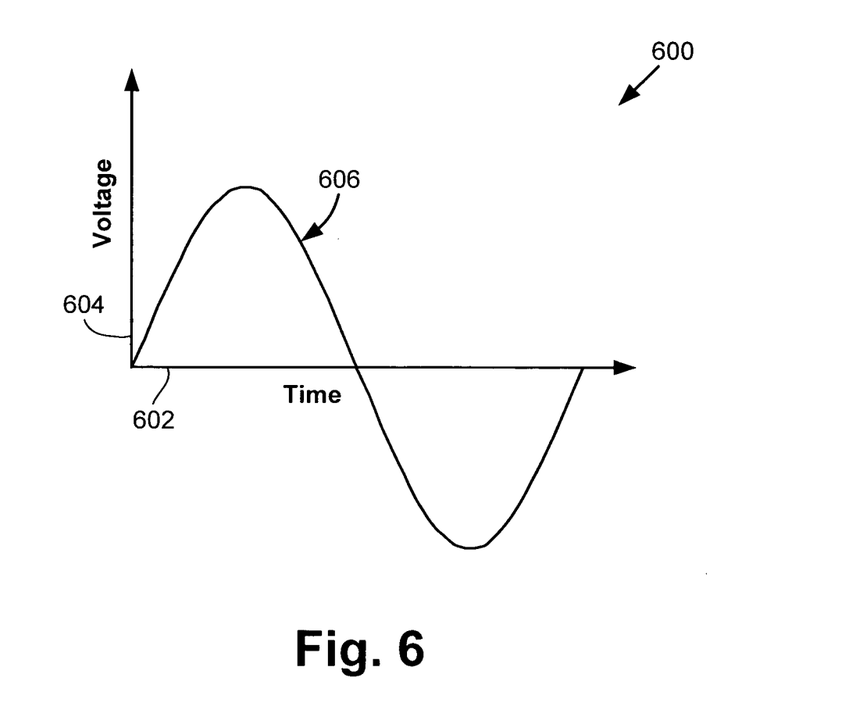
FIG. 6 is a graph showing an exemplary bus voltage in accordance with another embodiment of the present invention.

FIG. 6 shows exemplary graph 600 including an exemplary AC bus voltage in accordance with one embodiment of the present invention. Graph 600 includes time axis 602, voltage axis 604, and AC bus voltage 606. In graph 600, AC bus voltage 606 corresponds to Vbus 231 in an embodiment of the invention's driver circuit 200 in FIG. 2. As shown in graph 600, AC bus voltage 606 has a shape that substantially corresponds to a shape of an AC line voltage, such as an AC line voltage provided by AC line 202 in FIG. 2.

Figure 7:
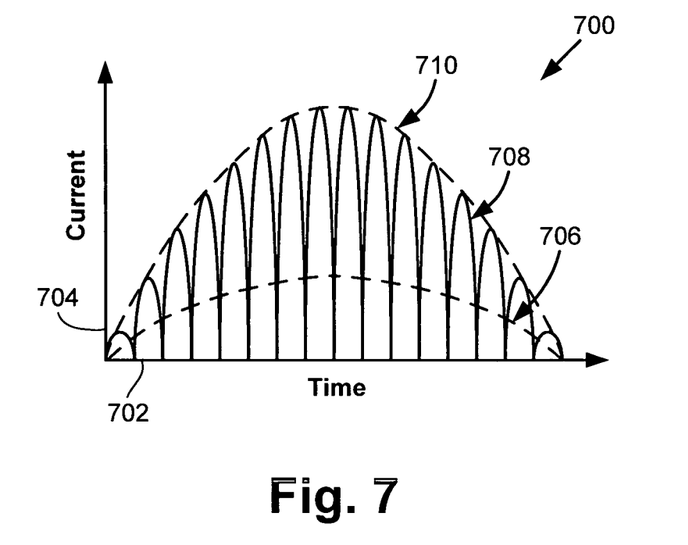
FIG. 7 is a graph showing an exemplary RMS AC line current drawn by an embodiment of the invention's driver circuit.

FIG. 7 shows exemplary graph 700 including an exemplary RMS AC line current in accordance with one embodiment of the present invention. Graph 700 includes time axis 702, current axis 704, RMS AC line current 706, high-frequency LED output current 708, and AC line voltage 710. In graph 700, RMS AC line current 706 corresponds to an RMS AC line current drawn by an embodiment of the invention's driver circuit 100 in FIG. 1 and also corresponds to an RMS AC line current drawn by an embodiment of the invention's driver circuit 200 in FIG. 2. In graph 700, high-frequency LED output current 708 corresponds to an LED output current flowing through load 104 in an embodiment of the invention's driver circuit 100 and also corresponds to an LED output current flowing through load 204 in an embodiment of the invention's driver circuit 200. In graph 700, AC line voltage 710 corresponds to an AC line voltage provided by AC line 102 in FIG. 1 and provided by AC line 202 in FIG. 2.

As shown in graph 700, the shape of RMS AC line current 706 substantially corresponds to the shape of AC line voltage 710. Thus, by providing a DC bus voltage (i.e. Vbus 148 in FIG. 1) having a shape that substantially corresponds to a shape of a rectified AC line voltage, an embodiment of the invention's driver circuit 100 in FIG. 1 can cause a shape of an RMS AC line current drawn by driver circuit 100 to substantially correspond to a shape of the AC line voltage, thereby providing an increased power factor. Also, by providing an AC bus voltage (i.e. Vbus 231 in FIG. 2) having a shape that substantially corresponds to a shape of an AC line voltage, an embodiment of the invention's driver circuit 200 in FIG. 2 can cause a shape of an RMS AC line current drawn by driver circuit 200 to substantially correspond to a shape of the AC line voltage, thereby providing an increased power factor.

Figure 8:
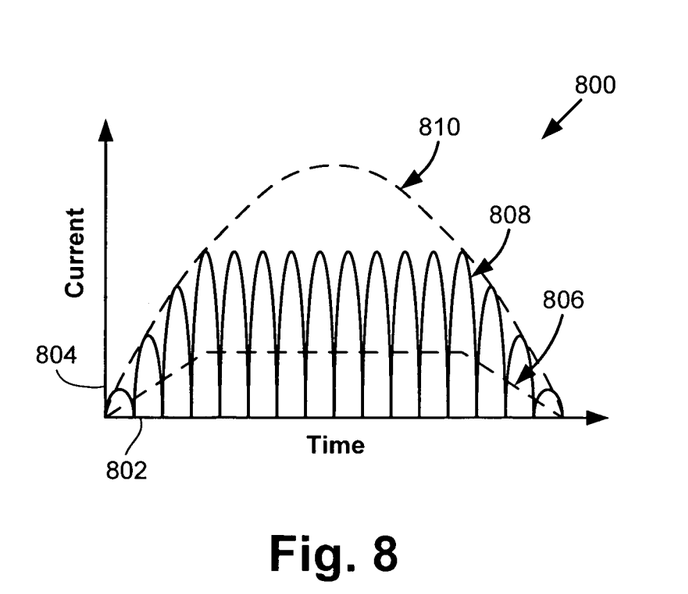
FIG. 8 is a graph showing another exemplary RMS AC line current drawn by an embodiment of the invention's driver circuit.

FIG. 8 shows exemplary graph 800 including an exemplary RMS AC line input current in accordance with one embodiment of the present invention. Graph 800 includes time axis 802, voltage current axis 804, RMS AC line current 806, high-frequency LED output current 808, and AC line voltage 810. In graph 800, RMS AC line current 806 corresponds to an RMS AC line current drawn by driver circuit 100 in FIG. 1 in an embodiment in which peak load current (i.e. peak LED current flowing through load 104) is limited. RMS AC line current 806 also corresponds to an RMS AC line current drawn by driver circuit 200 in FIG. 2 in an embodiment in which peak load current (i.e. peak LED current flowing through load 204) is limited. In graph 800, high-frequency LED output current 808 corresponds to an LED output current flowing through load 104 in an embodiment of the invention's driver circuit 100 in FIG. 1 and also corresponds to an LED output current flowing through load 204 in an embodiment of the invention's driver circuit 200 in FIG. 2, wherein peak load current is limited.

As shown in graph 800, the shape of RMS AC line current 806 corresponds in part to the shape of AC line voltage 810. Thus, by providing a DC bus voltage (i.e. Vbus 148 in FIG. 1) having a shape that substantially corresponds to a shape of a rectified AC line voltage and limiting peak load current, an embodiment of the invention's driver circuit 100 in FIG. 1 can cause a shape of an RMS AC line current drawn by driver circuit 100 to correspond in part to a shape of the AC line voltage, thereby providing an increased power factor. Also, by providing an AC bus voltage (i.e. Vbus 231 in FIG. 2) having a shape that substantially corresponds to a shape of an AC line voltage and limiting peak load current, an embodiment of the invention's driver circuit 200 in FIG. 2 can cause a shape of an RMS AC line current drawn by driver circuit 200 to substantially correspond to a shape of the AC line voltage, thereby providing an increased power factor.

Thus, as discussed above, by causing a DC bus voltage to have a shape substantially corresponding to a shape of a rectified AC line voltage, an embodiment of the invention's driver circuit 100 in FIG. 1 can power a load, such as an LED load, off-line while advantageously providing an increased power factor compared to a conventional solution employing a buck converter. Also, an embodiment of the invention's driver circuit 100 can provide higher efficiency than a conventional solution that utilizes a flyback circuit, while avoiding the maximum power limitation of the flyback circuit.

Also, by providing an AC bus voltage having a shape substantially corresponding to a shape of an AC line voltage, an embodiment of the invention's driver circuit 200 in FIG. 2 can power a load, such as an LED load, off-line while providing similar advantages as driver circuit 100, such as an increased power factor. Additionally, by not requiring a large polarized filter capacitor, such as an electrolytic capacitor, for voltage bus filtering, embodiments of the invention in FIGS. 1 and 2 can also provide increased reliability compared to conventional solutions that utilize an electrolytic filter capacitor for voltage bus filtering, while advantageously avoiding the cost of the electrolytic capacitor.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

The invention claimed is:

1. A driver circuit coupled between an AC line and a load, said driver circuit comprising:
a first semiconductor switch interposed between a bus voltage and a resonant circuit and a second semiconductor switch interposed between said resonant circuit and a ground, said first semiconductor switch and said second semiconductor switch having a substantially constant duty cycle;
a fault logic block detecting an open or short in said load;
said resonant circuit driving said load through a full-bridge rectifier, wherein said load is coupled between a positive terminal and a negative terminal of said full-bridge rectifier;
a feedback loop configured to sense a load current at an AC terminal of said full-bridge rectifier to adjust said load current, said AC terminal different from said positive and negative terminals;
said bus voltage having a shape substantially corresponding to a shape of a rectified AC line voltage, thereby increasing a power factor of said driver circuit;
wherein an electromagnetic interference (EMI) filter is coupled between said AC line and a node providing said bus voltage.

2. The driver circuit of claim 1, wherein said load comprises at least one LED.

3. The driver circuit of claim 1, wherein said first and second semiconductor switches each comprise a MOSFET.

4. The driver circuit of claim 1, wherein said load is isolated from said resonant circuit.

5. The driver circuit of claim 1, wherein said load comprises a plurality of LEDs coupled in an anti-parallel configuration.

6. The driver circuit of claim 1 further comprising another full-bridge rectifier coupled between said AC line and said first semiconductor switch.

7. The driver circuit of claim 1 further comprising a non-polarized capacitor coupled between said first semiconductor switch and said ground.

8. The driver circuit of claim 1 further comprising a control circuit for controlling an on-time of each of said first and second semiconductor switches.

9. The driver circuit of claim 1, wherein an RMS AC line current drawn by said driver circuit has a shape corresponding at least in part to a shape of an AC line voltage provided by said AC line.

10. A driver circuit coupled between an AC line and a load, said driver circuit comprising:
a first semiconductor switch interposed between a bus voltage and a resonant circuit and a second semiconductor switch interposed between said resonant circuit and a ground, said first semiconductor switch and said second semiconductor switch having a substantially constant duty cycle;
a fault logic block detecting an open or short in said load;
said resonant circuit driving said load through a full-bridge rectifier, wherein said load is coupled between a positive terminal and a negative terminal of said full-bridge rectifier;
a feedback loop configured to sense a toad current at an AC terminal of said full-bridge rectifier to adjust said load current, said AC terminal different from said positive and negative terminals;
said bus voltage having a shape substantially corresponding to a shape of an AC voltage provided by said AC line, thereby increasing a power factor of said driver circuit;
wherein an electromagnetic interference (EMI) filter is coupled between, said AC line and a node providing said bus voltage.

11. The driver circuit of claim 10, wherein said load comprises at least one LED.

12. The driver circuit of claim 10 further comprising an electromagnetic interference (EMI) filter interposed between said AC line and said bus voltage.

13. The driver circuit of claim 10, wherein each of said first and second semiconductor switches comprise a type 111-V semiconductor device.

14. The driver circuit of claim 13, wherein said type III-V semiconductor device is a GaN device.

15. The driver circuit of claim 10, wherein said resonant circuit is isolated from said load.

16. The driver circuit of claim 10 further comprising a control circuit for controlling an on-time of each of said first and second semiconductor switches.

17. The driver circuit of claim 10 further comprising a capacitor coupled between said AC line and said first semiconductor switch.

18. The driver circuit of claim 10, wherein an RMS AC line input current drawn by said driver circuit has a shape corresponding at least in part to a shape of said AC line voltage provided by said AC line.

* * * * *